(12) United States Patent
Liguori et al.

(10) Patent No.: US 6,578,476 B2
(45) Date of Patent: *Jun. 17, 2003

(54) PRINT PRODUCT ON DEMAND

(75) Inventors: Thomas A. Liguori, Poway, CA (US); Robert T. Jennings, San Diego, CA (US)

(73) Assignee: TLCD Corporation, San Diego, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 09/800,374

(22) Filed: Mar. 5, 2001

(65) Prior Publication Data

US 2002/0162472 A1 Nov. 7, 2002

(51) Int. Cl.[7] .......................... B41F 17/08; B41F 17/28; B41F 17/30
(52) U.S. Cl. ....................... 101/40.1; 101/488
(58) Field of Search ........................... 101/488, 33, 34, 101/38.1, 40.1, 8, 5, 93, 220; 358/1.12, 1.14, 1.15, 1.16, 1.9; 156/238, 240, 541

(56) References Cited

U.S. PATENT DOCUMENTS

| 2,700,629 A | * | 1/1955 | Townsend |
| 3,215,575 A | * | 11/1965 | Gobel |
| 3,584,574 A | | 6/1971 | Smith et al. |

(List continued on next page.)

FOREIGN PATENT DOCUMENTS

| EP | 0 209 896 | * | 7/1986 |
| EP | 0 495 111 | * | 7/1992 |
| JP | 62021546 | * | 1/1987 |
| JP | 06000838 | * | 1/1994 |
| JP | 06155518 | * | 6/1994 |
| WO | WO 96/06729 | * | 3/1996 |

OTHER PUBLICATIONS

"The Sawgrass Co.", Jan. 27, 2000, p. 1: www.sublimation.com.
Genny 200 Mug Press, Jan. 27, 2000, pp. 1–2 www.geoknight.com:Image Maker.
www.geoknight.com: Image Maker—994 Combo Press, Jan. 27, 2000, pp. 1–6.
www.geoknight.com: Heat Transfer Central, Jan. 27, 2000, pp. 1–6.
www.geoknight.com: Image Maker—294 Swing–Away Press, Jan. 27, 2000, pp. 1–2.
www.sublimation.com The Sawgrass Co., Products, Jan. 27, 2000, p. 1.
www.sublimation.com: Sawgrass Systems, Inc., Transfer Supplies, Jan. 27, 2000, pp. 1–7.
www.geoknight.com: Automatic Production Presses, Jan. 27, 2000, pp. 1.5.

*Primary Examiner*—Andrew H. Hirshfeld
*Assistant Examiner*—Leo T. Hinze
(74) *Attorney, Agent, or Firm*—Pillsbury Winthrop LLP (57) ABSTRACT

A system and process for placing printed color images on a series of objects including: generating digital data representing a plurality of different color images; providing a print medium composed of a substrate carrying a releasable coating which is formulated to retain printing inks; supplying the generated digital data to a digitally controlled color printer having a plurality of print heads; feeding the print medium through the printer while operating the print heads under control of the generated data; and placing a portion of the printed coating in contact with an objects and transferring the image to the object. The printed medium may be incorporated into a mold.

Alternatively, this may be accomplished by: providing a digitally controlled color printer having a plurality of print heads; feeding the objects to be printed upon past the printer; and operating the print heads under control of the generated digital data to print the color images on the objects.

14 Claims, 5 Drawing Sheets

U.S. PATENT DOCUMENTS

| | | | |
|---|---|---|---|
| 3,688,695 A | * 9/1972 | Covertside | 101/211 |
| 4,028,118 A | 6/1977 | Nakasuji et al. | |
| 4,207,365 A | 6/1980 | Hamisch, Jr. | |
| 4,334,471 A | 6/1982 | Noyes et al. | |
| 4,354,851 A | 10/1982 | Hix et al. | |
| 4,502,381 A | 3/1985 | Liguori | |
| 4,758,952 A | 7/1988 | Harris, Jr. et al. | |
| 4,893,555 A | 1/1990 | Leyland et al. | |
| 4,973,374 A | 11/1990 | Karlyn | |
| 5,142,975 A | * 9/1992 | Podalsky et al. | 101/40.1 |
| 5,152,861 A | * 10/1992 | Hann | |
| 5,244,529 A | 9/1993 | Siegel | |
| 5,247,314 A | 9/1993 | Stephenson | |
| 5,248,363 A | 9/1993 | Hale | |
| 5,379,056 A | 1/1995 | Walter et al. | |
| 5,464,729 A | 11/1995 | Hoebener et al. | |
| 5,527,407 A | 6/1996 | Gartland et al. | |
| 5,555,813 A | 9/1996 | Hale et al. | |
| 5,576,264 A | 11/1996 | Ueno et al. | |
| 5,589,121 A | * 12/1996 | Inagaki et al. | |
| 5,594,484 A | 1/1997 | Furukawa | |
| 5,598,202 A | 1/1997 | Peterson | |
| 5,642,141 A | 6/1997 | Hale et al. | |
| 5,643,387 A | 7/1997 | Berghauser et al. | |
| 5,677,043 A | 10/1997 | Hultman et al. | |
| 5,725,935 A | 3/1998 | Rajan | |
| 5,935,692 A | * 8/1999 | Smith | |
| 6,135,654 A | * 10/2000 | Jennel | |
| 6,151,130 A | * 11/2000 | Liguori | |

* cited by examiner

Polymer Systems Recommended For Good Adhesion Tc To Defined Substrates

| INKS RECOMMENDED | Substrates: Aluminum | Glass | Wood | Fabrics | Plastics Polyester | Plastics Vinyl | Plastics Styrenated |
|---|---|---|---|---|---|---|---|
| Polyvinyl butyral | X | X | | | | | |
| Acrylic | X | X | X | | | | X |
| Acrylonitrile | X | X | | X | | | |
| Epoxy | X | X | X | | | | X |
| Cyanoacrylate | X | X | | | | | |
| Polyester | | | | | X | | |
| Vinyl | | | | | | X | |
| Cellulosic | | | | X | | | X |
| Butadiene/Styrene | | | | | | | X |
| Polyurethane | | | X | | | | |
| Casein | | | X | | | | |
| Alkyd | | | X | | | | |
| Polyvinyl Chloride/Polyvinyl Acetate | | | X | | | | |
| Olefin | | | | X | | | |

PRINT PRODUCT ON DEMAND

BACKGROUND OF THE INVENTION

The present invention relates to a process and system for placing printed images, particularly printed color images, on objects having a variety of sizes and shapes.

It is known in the art to apply printed color images to various objects, including bottles, various other types of packages, writing instruments, etc., by first printing such images on release coats provided on support films, including polyester films, and then transferring the images to the final object. The processes and equipment currently employed for this purpose, typically of the offset or rotogravure type, can be operated economically only in those cases where a very large number of identical images are to be printed. This is true because very high set-up costs are associated with the creation of each image.

Typically, in the prior art, an image is separated into four basic process colors, such as cyan, magenta, yellow and black. A negative is created for each color and a photosensitive printing plate is developed for each negative. Once the four printing plates have been mounted on a press, they are inked and a press "make-ready" registration process is performed. Frequently, this operation itself takes several hours. As a result, it has not been considered economically feasible to use such a process to produce fewer than 20,000 copies of the same image.

It is also known in the art to produce computer generated color images that can be transferred to objects using sublimation inks. However, these require a significant amount of time to achieve transfer. Additionally, they are only transferable to objects having surface characteristics compatible with those sublimation inks.

Further, in the prior art, the printing of rounded or arcuate objects presented special problems. In order to print on a rounded object using an apparatus such as a hot press, an arcuate die was required to surround the area of the object being printed. This meant that a new or different die was required for each object having a different circumference or curvature to their outer portion. This posed an additional expense and required that the apparatus be changed each time a different object was printed. As such, it has not been considered economically feasible to use such a process to produce a low number of printed objects.

In view of these economic limitations, when a given design, or image, is to be produced in small numbers, it is the typical practice to employ silk screening. However, silk screening requires the use of multiple screens to produce images composed of a plurality of colors and care must be taken to properly position, or register, each screen on the object to which the image is to be applied.

Problems also arise when trying to decorate objects that are formed through a molding process. Many such objects are rounded, curved or have surfaces that are otherwise difficult to decorate. Some manufacturers insert controlled release surfaces into the mold so that the articles are decorated during the molding process. However, this process requires the additional step of stripping such surfaces from the article once the casting process is complete. Further, once the decoration has been placed on the articles, it may scratch or chip off unless a further protective coating is added over the decoration.

Therefore, there is a need for a versatile printing process that may be adapted to place images on curved objects or on objects formed through a molding process.

DETAILED DESCRIPTION OF THE INVENTION

The present invention utilizes digital image processing technology and digitally controlled color printing technology in a novel combination and configuration to make possible the printing of any desired combination of transfer images either directly on an item having an arcuate outer perimeter, on items having an arcuate outer perimeter via the medium a printing web, or onto molded objects.

Since one embodiment of the present invention utilizes digital or computerized data, it allows for the economic printing of a small number of objects. A user simply selects or design the image to be printed, then provides this data to the invention. By way of example, this data may be provided by e-mail, or on computer-readable media. Alternatively, a customer may select or design an image to be printed and provide it to the printer in the form of electronic or digital data. Having the customer provide the image or data that they would like printed, in the form that they would like to see the final image, dramatically reduces the front-end costs that are associated with having the person or entity that will perform the printing select and design the image to be printed. Since the printed data is pre-selected and provided by the customer, the printer does not have to prepare proofs of images based on a vague description by the customer, submit them for approval, and re-work them if necessary. Instead, the customer can provide exactly what they would like to see printed to the printer. This significantly reduces the front-end costs.

Figures 1, 1A, 3:
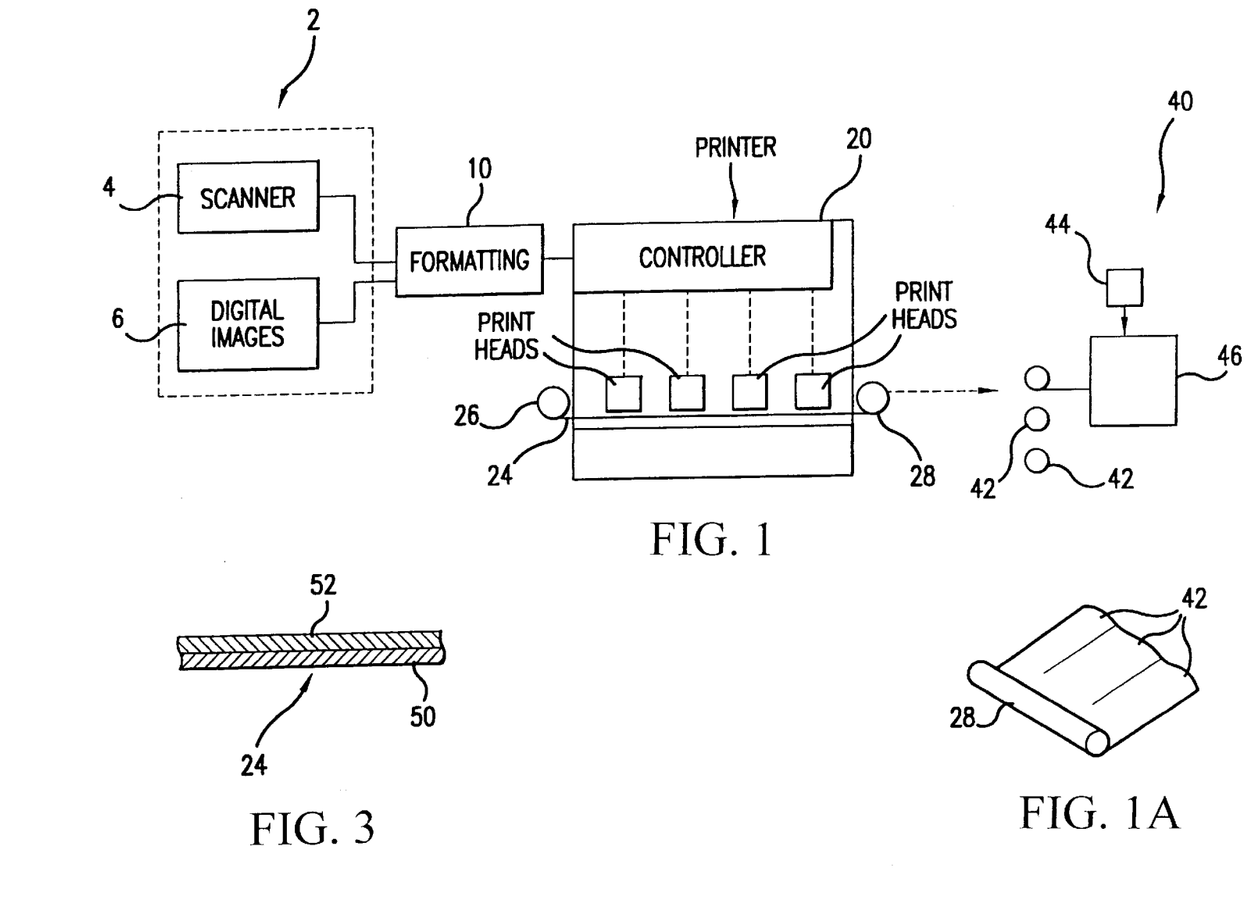
FIG. 1 is a simplified pictorial view of one preferred embodiment of the system in accordance with the present invention.
FIG. 1A is a pictorial view illustrating an operating step performed in connection with operation of the system of FIG. 1.
FIG. 3 is a cross-sectional detail view of a portion of a print medium utilized in the practice of the present invention.

One preferred arrangement for achieving the objects of the present invention is illustrated in FIG. 1. The illustrated system includes an image generating station 2 where digital data representing selected images are generated. By way of example, image generating station 2 may include a scanner 4 and a memory 6 containing digital image data derived from any external source. It will be understood that station 2 can consist of other sources of digital image data including a computer terminal connected to receive such data from remote locations including, but not limited to, internet sites.

All of the data for images to be printed are supplied to a formatting station 10 that will perform a variety of tasks. Specifically, in station 10, each image will be formatted to the desired size. In addition, data representing each image will be associated with position data designating the location at which the image is to be printed, either on a print medium or directly on an arcuate object. Depending on image size, a number of images can be placed side-by-side on the printing medium, to form several parallel columns of images, as well as being distributed along the length of the medium.

Figure 7:
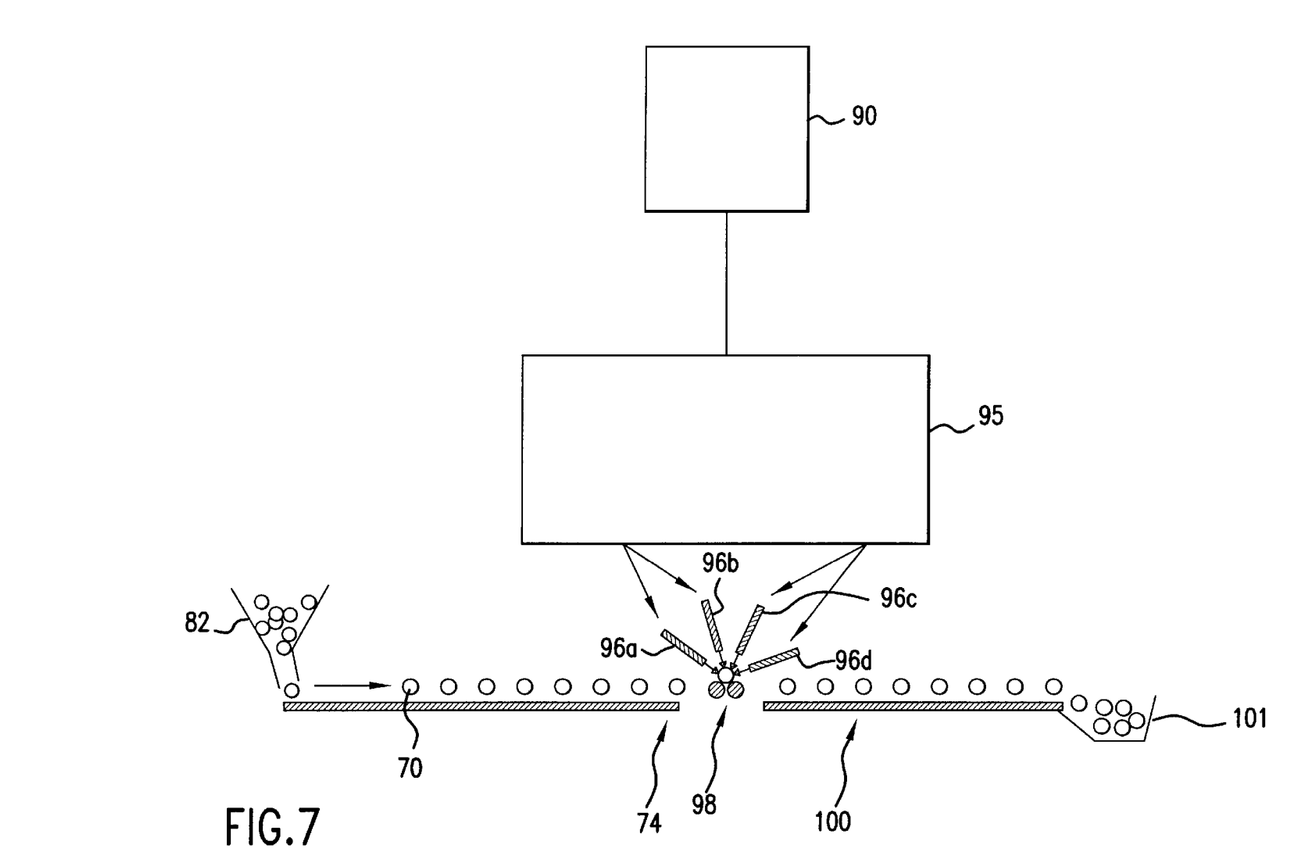
FIG. 7 is a simplified pictorial view of an alternate preferred embodiment of the present invention.

After data representing a plurality of images has thus been formatted and associated with position data, the combined data can be transferred to the controller of a digitally controlled color printer 20 which is capable of performing full color printing on a print medium in the form of a long web. Alternatively, as shown in FIG. 7, this printer may be configured to print directly on the object.

Printer 20 includes four print heads, each for printing black or a respective primary color in order to produce full color prints. Printer 20 is further equipped to receive an elongated print medium web 24 initially supplied to printer 20 in the form of a roll 26. Web 24 is unwound from roll 26 and fed through printer 20, passing each print head in succession.

The image data may initially be in any commonly used graphic format, a typical example being a Post Script™ format. The data processing system associated with the printer may be of a type which utilizes bit map images and is preferably constructed to directly receive bit map images from any one of the image sources or to convert images in other formats, such as Post Script™ formats, into bit map image files.

A suitable printer would be a DCP series printer marketed under the trade name XEIKON™ by Xeikon America, Inc. The DCP printer cited above can be controlled by existing software such as the Digital Imaging System marketed by Prime Source Corporation and packaged with DCP printers. This software includes a first subsystem termed a Raster Image Processor which translates postscript information into bitmap image files, and a second subsystem termed a Print Engine Supervisor which stores the bitmap files and manages printing conditions within the printer engine. The Raster Image Processor includes Harlequin ScriptWorks software. Operating personnel can interface with the Print Engine Supervisor with the aid of a Windows program entitled Xpose to perform job management functions. Xeikon also has available a front end application program known as the Variable Data System which can be used to produce print jobs with variable data. It should be understood that the printers within the scope of the invention include both ink jet and electrostatic types as well as jet types of single and multi-color printers as are well known in the art. Print data for controlling color printing of web 24 in a DCP series printer can be entered and formatted using the above-described software and operating instructions supplied therewith by the software publisher.

After being printed, web 24 may be wound into a take-up roll 28 and after the entire length of the web 24 has thus been printed, it can be delivered, for example manually, to an image transfer station 40. Depending on the needs and capacity of station 40, roll 28 may be cut lengthwise into a plurality of strips 42, as illustrated in FIG. 1A. Each strip 42 carries one column of images and may be formed into a roll for delivery to station 40. Station 40 also includes a source 44 of objects to which the printed images are to be transferred.

Alternatively, web 24 may be fed from printer 20 to image transfer station 40 without first being wound into a take-up roll. In this embodiment, it is unlikely that web 24 will need to be cut lengthwise into the plurality of strips 42. Ink jet heads like those available from APRION may be used for such "in line" printing. Such ink jet heads are capable of shooting ink onto substrates such as paper and plastic. These differ from the XEIKON™ in that the XEIKON™ process uses electrostatic particles of toner. Other methods of applying ink are also within the scope of the present invention.

As may be seen in FIG. 1, station 40 may include, for example, a known high-speed hot stamping machine 46 which is equipped to bring each object to which a printed image is to be transferred into position relative to an associated image on web 24, after which appropriate heat and pressure are applied to transfer the image to the object. Such objects may be curved, generally flat, or three-dimensional. In one embodiment of the present invention, this heat is applied from the side of the print medium that is away from the object 70.

The printed images can be transferred to virtually any type of object made of a material to which the ink forming the images will adhere. For example, a wide range of plastics, including polystyrene, polyester, etc., will satisfy this requirement. Further, the images may be transferred to wood, glass or aluminum two and three-dimensional objects. Objects to which images may be transferred include three-dimensional writing instruments or parts thereof, key cases, any type of bottles, etc. These specific objects are cited only by way of example, it being understood that images can be transferred to virtually any manufactured object. Other three-dimensional objects include paper cubes, boxes and the like. The present invention has been shown to have particular applicability to objects having at least one surface which extends into a second plane, i.e. a three-dimensional object.

Figure 2:
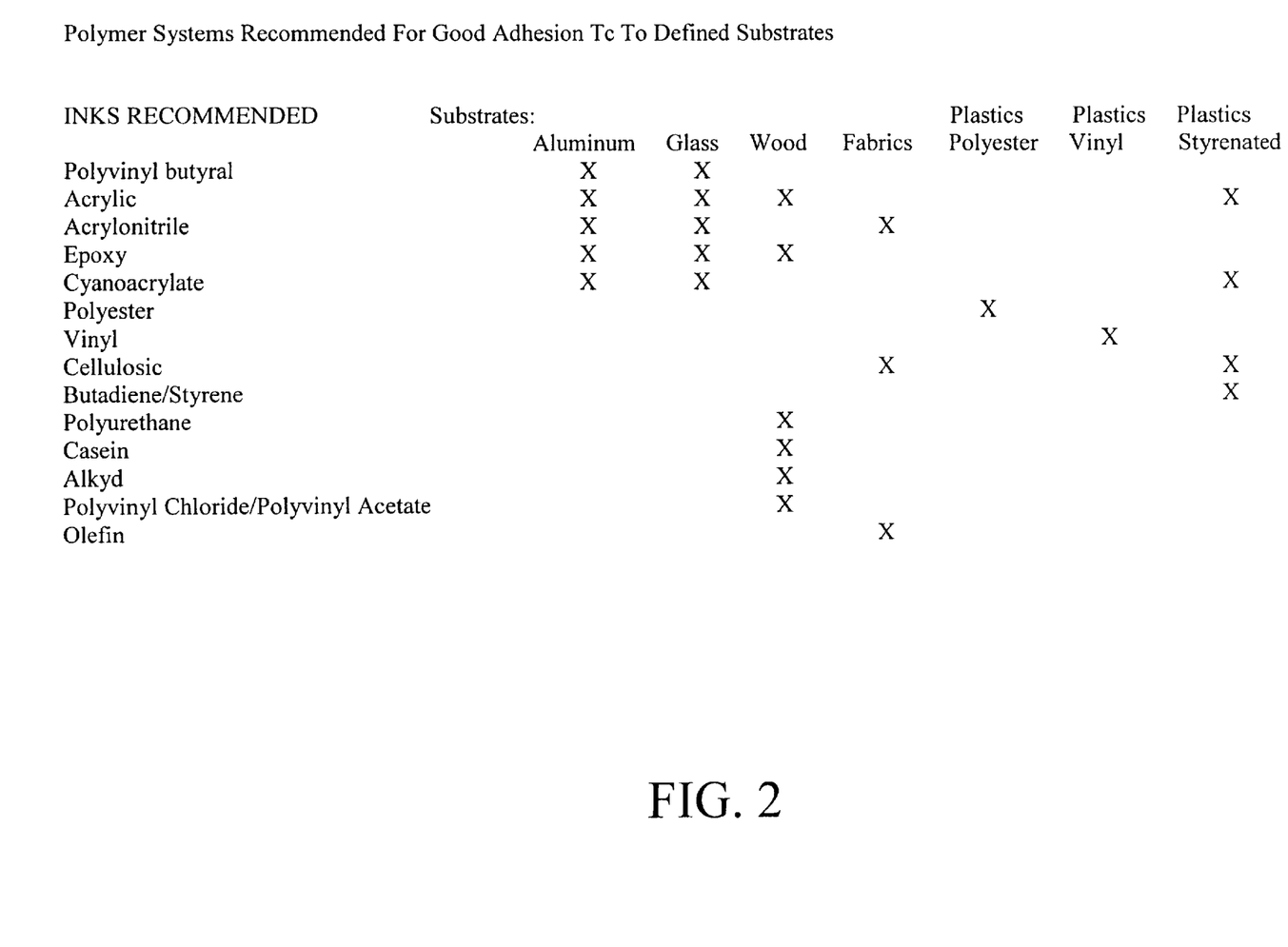
FIG. 2 provides a view of a chart listing some of the most common inks that may be utilized in the present invention, and the substrates to which they adhere most soundly.

FIG. 2 provides a chart listing some of the most common inks that may be utilized in the present invention, and the substrates to which they adhere most soundly. As shown in FIG. 2 inks which may be used in this process include, but are not limited to, polyvinyl butyral, acrylic, acrylonitrile, epoxy, cyanoacrylate, polyester, vinyl, cellulosic, butadiene, styrene, polyurethane, casein, alkyd, polyvinyl chloride, polyvinyl acetate, and olefin inks. The ink used in the present invention is preferably chosen based on, among other factors, its ability to adhere to the substrate being printed, the printer's ability to apply the particular ink, and the like. For example, acrylic, epoxy, polyurethane, casein, alkyd, polyvinyl chloride and polyvinyl acetate inks are more appropriate for printing on wood, while polyvinyl butyral, acrylic, acrylonitrile, epoxy, and cyanoacrylate inks are more appropriate for printing on aluminum and glass. Further, olefin, cellulosic and acrylonitrile inks are more appropriate for printing on fabrics.

It should be noted that, unlike ink sublimation transfers, the present invention does not require the image to be wrapped around the object and subjected to heat and pressure over a significant period of time. Rather, in one embodiment, a tangential line of contact is created between the die surface, the image and the object. In the case of an embodiment using an ink jet, the ink is applied by means of direct application onto the surface, and not by means of a heat transfer process.

The method according to one embodiment of the present invention may include coating an adhesive onto the object to be printed prior to transfer of the image from the substrate to the object. This adhesive may serve to more firmly adhere the image to the object being printed. The adhesive may be placed on the area that is to be covered by the image. The amount of adhesive placed may vary depending on need or convenience. The adhesive may be placed such that it extends beyond the image. Alternatively, the adhesive may be selectively placed so that, when printed, the image entirely covers the adhesive. Such adhesive may be any that is known in the art. The adhesive may be placed on the object by any means as in known in the art including, but not limited to, dipping, spraying and painting.

To perform the printing and image transfer operations that involve first printing on a web then transferring the images as described above, it is necessary to provide a specially constructed web 24 which is capable of being wound into a roll and receiving printed images in a manner which allows subsequent transfer of those images to surfaces of objects. For this purpose, web 24 may be composed, as shown in FIG. 3, of a suitable plastic substrate 50 provided with a special release coating 52 that is capable of retaining printing ink and of being easily separated from substrate 50. By way of example, substrate 50 may be made of Mylar® and coating 52 may be a release coating which is formulated to retain a printed image until the coating is applied against an object with sufficient heat and pressure to transfer the image and the coating to the object. This will ensure that images are not prematurely transferred from the coating if print medium 24 is wound onto roll 28 prior to transferring the image to the object.

As should be self-evident, print medium 24 would be fed through printer 20 with release coating 52 facing the print heads and would be fed through machine 46 so that coating 52 comes in contact with the object to which a printed image is to be transferred.

One material which may be employed as substrate 50 is a 75 gauge polyester film; this can be obtained from many sources.

Coating 52 may be based on an acrylic polymer modified with additives to enhance release from polyester film 50 and adherence to the target surface of the object. The additives employed may include melamine or urea-formaldehyde resins, microcrystalline waxes, acetylenic diols, plasticizers, solvents, etc. Coating 52 may be produced from a solvent based formulation or an emulsion based formulation. The former will generally be applied in the form of a continuous film, while the latter will take the form of a discontinuous film which is converted into a continuous film as a result of coalescense of the emulsion particles under heat and pressure during the stamping process. The following are exemplary formulations for each coating type.

| 1. Solvent Based: | |
|---|---|
| Acrylic Resin Solution in Mineral Spirits | 80.0% |
| Mineral Spirits | 12.0% |
| Microcrystalline wax | 8.0% |
| 2. Emulsion Based: | |
| Styrene acrylic emulsion | 55.0% |
| Ammonium Zirconium Carbonate Solution | 13.0% |
| Sodium Polyacrylate Solution | 4.0% |
| Polyoxyethylene Glycols | 0.5% |
| Microcrystalline wax | 10.0% |
| Deionized water | 9.5% |
| Isopropyl alcohol | 8.0% |

According to preferred embodiments of the invention, the acrylic resin of the solvent-based composition is isobutyl methacrylate and/or butyl methacrylate polymer, and the styrene acrylic emulsion of the emulsion-based composition is an emulsion copolymer of styrene and 2-ethyl hexyl acrylate and/or butyl acrylate. The above formulas are given only by way of example; other formulations known to be suitable for use as release coats capable of receiving printed images may be used.

Also within the scope of this invention is the use of a coating that has antimicrobial qualities, including antibiotic, antifungal, antiviral and similar qualities. Since pens and similar writing instruments are often used by many different people, there is the possibility that they could transfer microbes from person to person. One possible solution to this problem is to incorporate sufficient amounts of an anti-microbial agent into the pen body. However, a problem with such approach is that large quantities of the agent may be necessary to be effective. In the present invention, since only the outer surface of a pen is typically handled, only the outer surface is treated, e.g. by the use of a coating that contains such an antimicrobial agent.

Also within the scope of this invention is the use of a coating that has uv-protective qualities. Such a coating may be used to prevent fading and degradation on products that are exposed to uv rays, such as signage.

Either type of coating may be suitably applied to a Mylar® or other polyester substrate by, for example, a continuous web flexographic process or by other known techniques. After application, the coating will be dried under time and temperature conditions suitable for the vehicles employed.

Image data may be obtained simultaneously from a plurality of, i.e., two or more, image sources. Each source may be a scanner, a computer, etc.

According to preferred embodiments of the invention that involve printing first on a web then transferring the images from the web to the objects, data from a plurality of sources, such as scanner 4 and memory 6 in FIG. 1, is processed and formatted so that the data from each source produces images in a respective column on web 24, each column extending in the direction of the length of the web and the plural columns being spaced apart in the direction of the width of the web. Such sources may include, but are not limited to, a computer, a scanner, and the world-wide-web. Transmission of images to be printed from remote locations is within the scope of this invention.

After printing, web 24 may be slit lengthwise into a plurality of strips 42, each carrying one column of images, as shown in FIG. 1A. As noted above, it should be understood that if web 24 is fed directly to the hot stamping machine from the printer, it may not need to be split into a plurality of strips 42.

The hot stamping machine may be a commercially available machine, for example a Harvey roll-on deco machine, preferably a single head model HFR-100 or a double head model HFRO-200. In addition, machines of this type are disclosed in U.S. Pat. No. 4,502,381. These machines are marketed by the Harvey Machine Co. of Nashville, Tenn. Another suitable hot stamper may be the PRECO™ automatic film transfer roll stamper machine, model KS-65. This machine is manufactured by the Preco Company of Osaka, Japan.

Figure 4:
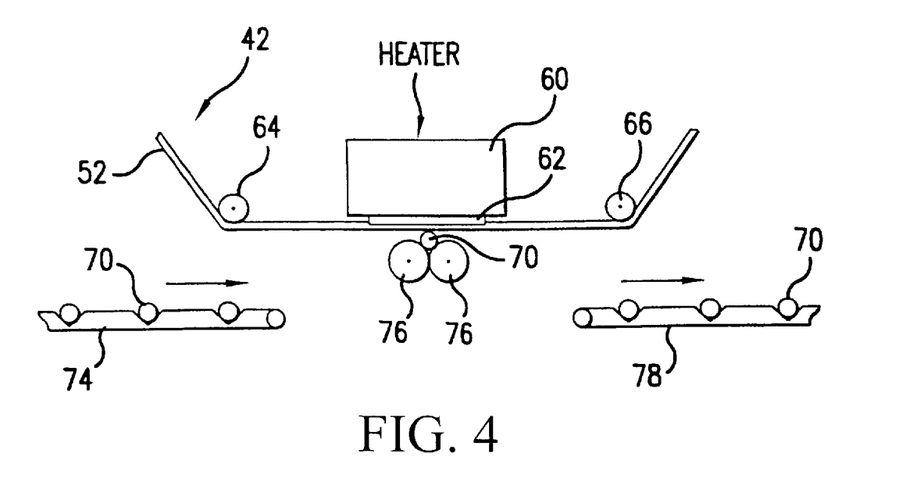
FIG. 4 is a pictorial, side-elevational detail view of a portion of the interior of a first embodiment of a stamper employed as a component of a system according to the invention.
Figure 5:
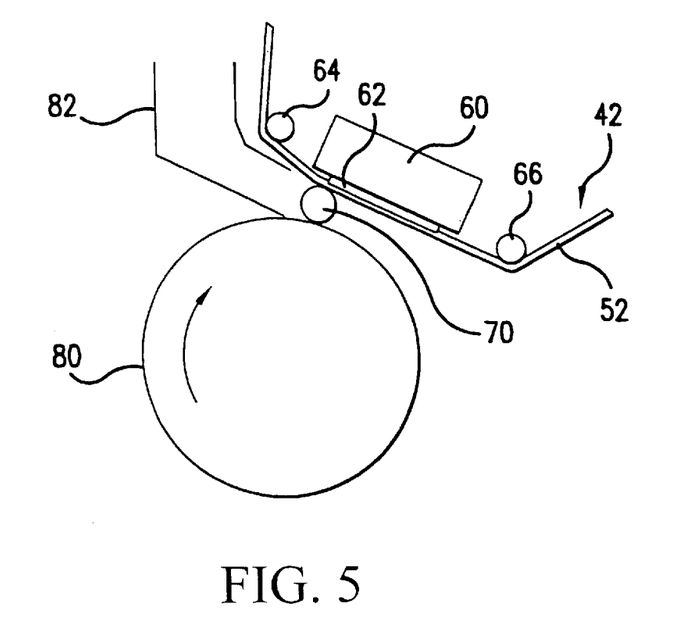
FIG. 5 is a view similar to that of FIG. 4 of another embodiment of a stamper employed as a component of a system according to the invention.

FIGS. 4 and 5 show the basic components of respective ones of the two above-cited Harvey machines.

The interior of the hot stamping machine depicted in FIG. 4 includes a heater 60 which carries, at its lower surface, a heated die 62 that may be made of a silicone material. A selected web strip 42 is fed through the machine by being guided around two rollers 64 and 66 so as to come into contact with die 62. Strip 42 is oriented so that coating 52 faces downwardly. A succession of objects 70 upon which images are to be transferred is conveyed by a transfer positioning conveyor 74. The transfer positioning conveyor 74 may take the form of a toothed conveyor, a walking beam, a conveyor belt, a rotary table or any conveying means as is known in the art.

Each object 70 is conveyed in turn to a transfer position where it is supported by two pressure rollers 76. In the illustrated example, each object 70 has the form of a circular cylinder and may be constituted, for example, by a pen or pen cap. Strip 42 is advanced along die 62 and halted at an indexed stamping position. Then, with strip 42 stationary relative to die 62, rollers 76 press object 70 against coating 52 and are displaced parallel to coating 52 while rollers 76 are allowed to rotate freely about their respective axes so that object 70 rolls about its longitudinal axis along coating 52 until the complete circumference of object 70 has made contact with strip 42. In an alternate embodiment of the present invention, a mandrel may be used to hold and turn hollow objects. Thus, object 70 and coating 52 are maintained in non-sliding contact with one another while heat is applied by heater 60 and pressure is applied by rollers 76 in order to transfer a selected image to the peripheral surface of object 70. After such transfer, object 70 is withdrawn from the image transfer position and placed on an exit conveyor 78. This exit conveyor may be a toothed conveyor, a walking beam, a conveyor belt, a rotary table or any conveying means as is known in the art.

The stamping machine is provided with suitable mechanisms for conveying each object 70 in turn from transfer positioning conveyor 74 to the transfer position where it is supported by rollers 76, and for subsequently conveying an object 70 to which an image has been transferred onto exit conveyor 78. Since this mechanism forms part of a known, commercially available stamping machine, and is thus not a novel feature of the present invention, it has not been illustrated or described herein. Conveyance of each object 70 to the transfer location is synchronized with the indexing movements of strip 42.

The basic components of a second embodiment of a known stamping machine which may be employed as a component of a system according to the present invention is illustrated in FIG. 5, where elements identical to those of FIG. 4 are identified with the same reference numerals. In the embodiment of FIG. 5, rollers 76 are replaced by a single, large-diameter roller 80 made of a relatively resilient material, for example, a silicon material, which will press each object 70 in turn against coating 52 of a selected portion of strip 42. Roller 80 is resiliently deformable to be able to press object 70 against coating 52 while rolling object 70 along the portion of coating 52 which carries an image that is to be transferred to object 70.

Heater 60 and die 62 are tilted relative to the orientation shown in FIG. 4 so that a portion of strip 42 whose coating 52 carries a given transfer image is inclined to the horizontal. Strip 42 and roller 80 form a gap having a selected thickness. A plurality of objects 70 are stored in a hopper 82 which has an outlet located adjacent the more elevated, or leading, end of die 62. Hopper 82 is equipped with a suitable mechanism to dispense each object 70 in turn into the gap between strip 42 and roller 80. Alternatively, the hopper 82 may be designed to work with gravity.

For transferring an image to an object 70 as in one embodiment of the present invention as shown in FIG. 5, strip 42 is advanced until the image to be transferred is accurately positioned on die 62 and strip 42 is halted. Then objects 70 are fed from hopper 82 in order and descend under the effect of gravity into the gap between strip 42 and roller 80, at the location of the leading end of die 62. At the same time, roller 80 is rotating in the direction of the arrow so as to press object 70 against coating 52 and roll object 70 along the portion of coating 52 which is supported by die 62 and which carries the image to be transferred to object 70. During transfer of the image, object 70 rolls without sliding along coating 52. The pressure applied by roller 80 cooperates with the heat supplied by heater 60 via die 62 to effect transfer of an image from coating 52 to the peripheral surface of object 70. When object 70 has reached the lowermost, or trailing, end of die 62, image transfer will have been completed and object 70 may fall under the influence of gravity into a collecting receptacle (not shown). Alternatively, the object 70 can be placed on a mandrel and rotated about the circumference of roller 80 such that the transfer takes place. The key is that there is relative movement between the object 70 and roller 80 such that the coating 52 is transferred to the object 70.

Figure 6:
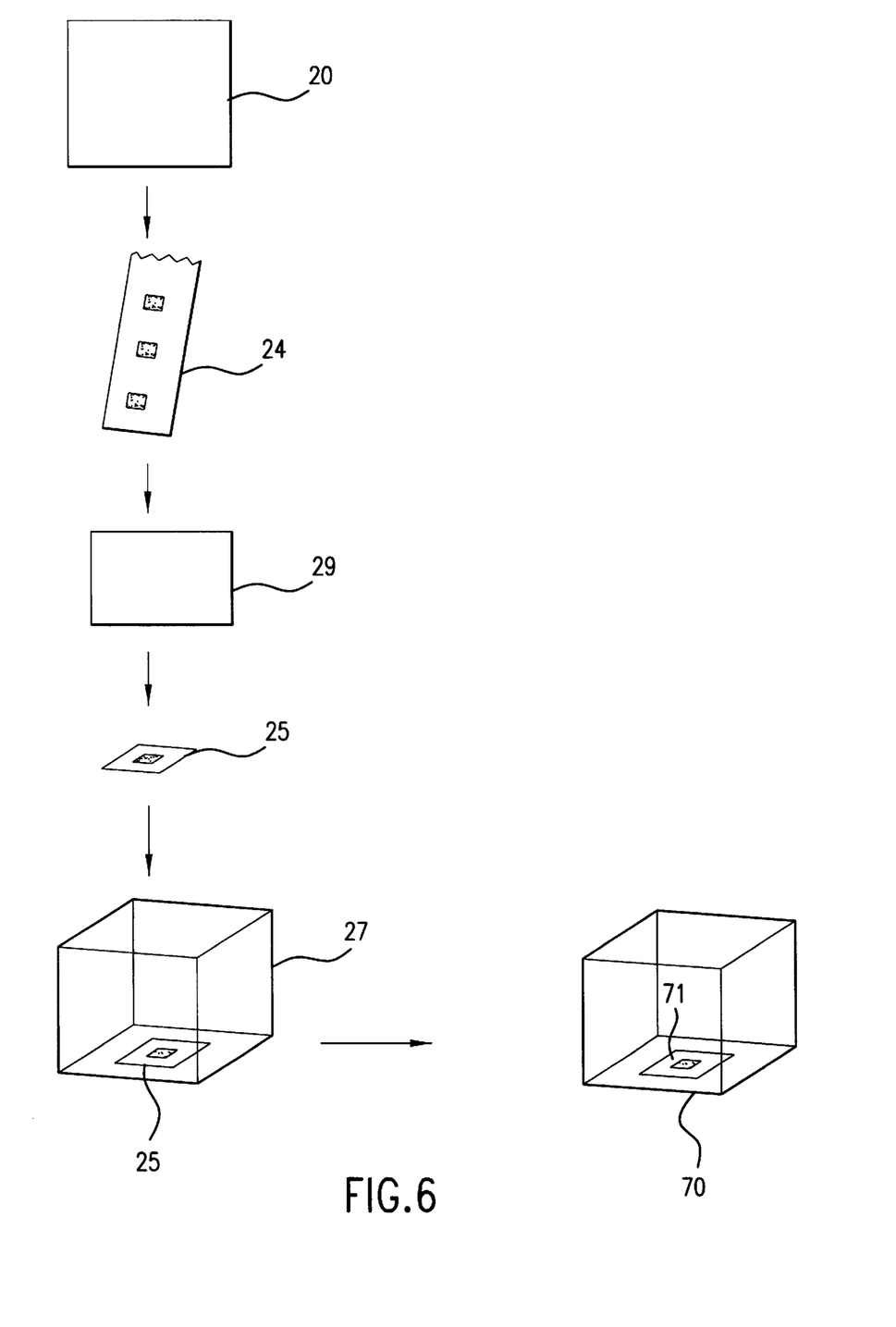
FIG. 6 is a simplified pictorial view illustrating the steps involved in performing a process of the present invention.

In another embodiment of the present invention, shown in FIG. 6, after having been printed, web 24 (only a portion of web 24 is shown) may be separated or cut into a plurality of segments using a separating means 29, such as a cutting edge or a pulling force to separate the web at perforations. Such segments 25 may include quadrangles, circles, triangles, or any other shape, whether or not geometric. These segments may be placed, either manually or mechanically, into the bottom of mold 27, with the side that was printed upon facing "up," or away from the surface of the mold. Mold 27 may be incorporated with any molding apparatus or molding means as are currently known in the art. The mold 27 may be designed to form objects that are three dimensional, curved, oddly shaped or generally flat. Such mold may then be filled with rubber or plastic in a manner that is also known in the art. The heat of the molding process and the presence of the liquid molding material, which may be any as is known in the art, but is preferably rubber or plastic, causes the web 24 to adhere to and become part of the object 70 being molded. This generates a clear protective layer 71 over the decorated portion of the surface of the object. It further causes the image to bond to the object 70 being molded. Thus, the process produces a molded, decorated object that is covered by a clear protective layer 71, which inhibits the removal of the decoration.

In another embodiment, the web 24 is not cut into segments. Rather, a portion of the web 24 is placed into the mold 27 such that a portion of the web overlaps the sides of the mold. The mold is then filled with the molding composition. The web is placed such that the image to be transferred or embedded is located within the mold 27. The molding process forms a protective layer over the image portion on the web. The web is then advanced once the process repeated. The web is also trimmed such that the portion of the web overlapping the mold is removed.

FIG. 7 illustrates a preferred arrangement for achieving the objects of the present invention. The illustrated system includes an image generating station 90 where digital data representing selected images are generated. It will be understood that station 90 can consist of any sources of digital image data including a computer terminal connected to receive data from remote locations including, but not limited to, Internet sites.

The system illustrated in FIG. 7 includes a digitally controlled printer 95. The printer depicted has a plurality of print heads 96(a)–(d) (depicted as separated from the printer for clarification purposes only). While only four print heads are shown, it should be understood that the number of print heads may range from as low as one to as many as can be arranged by one skilled in the art around the object to be printed upon.

After data representing an image or a plurality of images has been formatted and associated with position data, the combined data may be transferred to the controller of a digitally controlled printer 95 which is capable of performing full color printing directly onto objects 70. Objects 70 may have a curved exterior outer surface. This direct printing simplifies the printing process by removing the web printing step that is necessary in other embodiments of the present invention. Additionally, the direct printing is faster than the process involving the transfer of an image from a web onto an object. The image or images are transferred directly to the object 70, thus eliminating the time required for sublimation of the ink to transfer it from the medium to the object. This saves time and minimizes errors. Further, it provides economic advantages since the web and the hot stamping apparatus are not required.

As with the other embodiments of the present invention, the printed images can be transferred to virtually any type of object 70 that is made of a material to which the ink forming the images will adhere. Objects to which images may be transferred include writing instruments or parts thereof, key cases, any type of bottles, etc. These specific objects are cited by way of example, it being understood that images can be transferred to a wide variety of curved and other three-dimensional products.

To perform the printing and image transfer operations described above, it is necessary to provide a transfer positioning conveyor 74. This conveyor 74 may take the form of a walking beam, conveyor belt, toothed conveyor belt, rotary table or other mechanism known in the art that is capable of performing a similar function to provide the objects to be decorated to the printing platform 98. The printing platform 98 is associated with a turning motor (not shown) to provide rotational movement organized with the application of droplets of ink from the ink jet heads as the objects are being printed. The printing platform 98 may be composed of rollers as depicted, a moderately curved surface, or any other structure that is capable of holding and rotating the object as it is being printed. The area where the objects are printed will be referred to as the printing station.

The present invention is provided with suitable mechanisms for conveying each object 70 in turn from transfer positioning conveyor 74 to printing platform 98 where it is rotationally moved as the print heads 96(a)–(d) print the desired image or images on the object 70. After being printed, the object 70 is withdrawn from the printing station and placed on an exit conveyor 100 that is designed in a manner similar to the conveyor 74 that provides the objects to the printing station.

A loading hopper 82 may be located so that it delivers objects 70 to be printed to the transfer positioning conveyor 74. Objects 70 may be delivered in the same manner as in other embodiments of the present invention. A delivery bin 101 may be located at the end of the exit conveyor 100 to collect objects that have been printed.

It will be understood that the embodiment of the present invention depicted in FIGS. 6 and 7 may include certain features of other embodiments of the present invention including, but not limited to, a formatting station and the ability to receive image data from a plurality of sources.

In the embodiments of the invention discussed above, the object being printed has been rotated during the printing process, while the die and/or print head have remained stationary. It should be understood by one knowledgeable in the art that in other embodiments of the invention, that non-sliding contact may be generated by mounting the die on a rotating apparatus such that it is rotated during image transfer, while the objects are held steady. Further, the print heads may be mounted on a similar apparatus so that they can be rotated while printing on a stationary object.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A process for placing printed color images on a series of objects, each object having a curved exterior surface, the process comprising the steps of:

generating digital data for printing onto a print medium to form a plurality of color images, wherein the data represents a plurality of color images and a location where the colors may be printed to form the images;

providing a print medium, said medium having first and second sides, with the first carrying a coating which is releasable from the medium and is formulated to retain printing inks, wherein the print medium is constituted by an elongated web which is in the form of a roll;

providing a digitally controlled color printer having a plurality of print heads for dispensing printing inks of respectively different colors;

supplying the generated digital data to the printer;

feeding the print medium through the printer and past the print heads such that the web is unwound from the roll for feeding through the printer and operating the print heads under control of the generated data to print the color images on the coating;

arranging the images to be printed onto the coating of the print medium to form at least one column of images;

providing a transfer positioning conveyor for placing the objects to be printed at a desired location relative to the print medium;

moving a succession of the objects to be printed by the conveyor to a position adjacent to the print medium;

placing a portion of the coating on which an image has been printed in contact with the object; and applying heat by means of a heater to the print medium, wherein the conveyor is disposed adjacent to the first side of the print medium and the heater is disposed adjacent to the second side of the print medium; and transferring the image to the curved exterior surface of the object by rotating the object such that (i) the curved exterior surface of the object comes into contact along a portion of the coating on which an image has been printed; (ii) printing of the object begins and ends at predetermined times; and (iii) the object and coating are maintained in a non-sliding contact with one another.

2. The process of claim 1, wherein each color image is generated by a respective one of a plurality of data sources.

3. The process of claim 1, wherein the coating is formed from one of the group consisting of an acrylic resin solution and a styrene acrylic emulsion.

4. The process of claim 1, wherein the transferring step comprises pressing the object against the coating portion by means of rollers which advance the object relative to the web while maintaining the object in non-sliding contact with the coating.

5. The process of claim 1, wherein a portion of the object which comes into contact with the coating is coated with adhesive prior to contact with the coating.

6. The process of claim 1, further including providing a loading hopper to deliver objects to be printed to the transfer positioning conveyor.

7. An apparatus for placing printed color images on a series of objects, each object having a curved exterior surface, through the intermediary of a print medium, said print medium having a first and a second side, with the first side carrying a coating, which is releasable from the medium and is formulated to retain printing inks, and wherein said print medium is constituted by an elongated web and wherein the images are arranged side by side on the coating to form at least one column of images, the apparatus comprising:

means for generating digital data representing at least one color image;

a digitally controlled color printer having a plurality of print heads;

a printing controller connected to receive the digital data from the means for generating digital data and for supplying printer control signals to the print heads; and means for feeding the print medium through the printer and past the print heads while operating the print heads under control of the printer control signals to print the color images on the coating;

a transfer positioning conveyor for placing the objects to be printed at a desired location relative to the print medium;

heating means for supplying heat to the print medium, wherein the conveyor is disposed adjacent to the first side of the print medium and the heating means is disposed adjacent to the second side of the print medium; and rotating means for rotating the object such that (i) the curved exterior surface of the object comes into contact along the portion of the coating on which the image to be transferred has been printed; (ii) the printing of the object begins and ends at predetermined times; and (iii) the object and coating are maintained in non-sliding contact with one another.

8. The apparatus as in claim 7, wherein the coating is formed of one of the group consisting of an acrylic resin solution and a styrene acrylic emulsion.

9. The apparatus as in claim 7, wherein the rotating means includes an element selected from the group consisting of a plurality of rollers, a mandrel and a non-planar platform.

10. The apparatus as in claim 7, wherein each color image is generated by a respective one of a plurality of data sources.

11. The apparatus as in claim 7, further including means for coating a portion of the object with adhesive.

12. The apparatus as in claim 7, further including an exit conveyor.

13. A process for placing printed color images on a series of objects, each object having a curved exterior surface, the process comprising the steps of:

generating digital data for printing onto a print medium to form a plurality of color images, wherein the data represents a plurality of color images and a location where the colors may be printed to form the images;

providing a print medium, said medium having first and second sides, with the first carrying a coating which is releasable from the medium and is formulated to retain printing inks, wherein the print medium is constituted by an elongated web which is in the form of a roll;

providing a digitally controlled color printer having a plurality of print heads for dispensing printing inks of respectively different colors;

supplying the generated digital data to the printer;

feeding the print medium through the printer and past the print heads such that the web is unwound from the roll for feeding through the printer and operating the print heads under control of the generated data to print the color images on the coating;

arranging the images to be printed onto the coating of the print medium to form at least one column of images;

providing a transfer positioning conveyor for placing the objects to be printed at a desired location relative to the print medium;

moving a succession of the objects to be printed by the conveyor to a position adjacent to the print medium;

coating one of the objects to be printed with adhesive;

placing a portion of the coating on which an image has been printed in contact with the object; and applying heat by means of a heater to the print medium, wherein the conveyor is disposed adjacent to the first side of the print medium and the heater is disposed adjacent to the second side of the print medium; and transferring the image to the curved exterior surface of the object by rotating the object such that (i) the curved exterior surface of the object comes into contact along a portion of the coating on which an image has been printed; (ii) printing of the object begins and ends at predetermined times; and (iii) the object and coating are maintained in a non-sliding contact with one another.

14. An apparatus for placing printed color images on a series of objects, each object having a curved exterior surface, through the intermediary of a print medium, said print medium having a first and a second side, with the first side carrying a coating, which is releasable from the medium and is formulated to retain printing inks, and wherein said print medium is constituted by an elongated web and wherein the images are arranged side by side on the coating to form at least one column of images, the apparatus comprising:

means for generating digital data representing at least one color image;

a digitally controlled color printer having a plurality of print heads;

a printing controller connected to receive the digital data from the means for generating digital data and for supplying printer control signals to the print heads; and means for feeding the print medium through the printer and past the print heads while operating the print heads under control of the printer control signals to print the color images on the coating;

coating means for coating a portion of an object to be printed with adhesive;

a transfer positioning conveyor for placing the objects to be printed at a desired location relative to the print medium;

heating means for supplying heat to the print medium, wherein the conveyor is disposed adjacent to the first side of the print medium and the heating means is disposed adjacent to the second side of the print medium; and rotating means for rotating the object such that (i) the curved exterior surface of the object comes into contact along the portion of the coating on which the image to be transferred has been printed; (ii) the printing of the object begins and ends at predetermined times; and (iii) the object and coating are maintained in non-sliding contact with one another.

* * * * *